(12) United States Patent
Kato et al.

(10) Patent No.: US 6,680,353 B1
(45) Date of Patent: Jan. 20, 2004

(54) POLYESTER RESIN COMPOSITION AND FIBER

(75) Inventors: Jinichiro Kato, Nobeoka (JP); Tetsuko Takahashi, Nobeoka (JP)

(73) Assignee: Asahi Kasei Kabushiki Kaisha, Osaka (JP)

( * ) Notice: Subject to any disclaimer, the term of this patent is extended or adjusted under 35 U.S.C. 154(b) by 0 days.

(21) Appl. No.: 09/830,355

(22) PCT Filed: Oct. 29, 1999

(86) PCT No.: PCT/JP99/06058

§ 371 (c)(1),
(2), (4) Date: Apr. 25, 2001

(87) PCT Pub. No.: WO00/26301

PCT Pub. Date: May 11, 2000

(30) Foreign Application Priority Data

Oct. 30, 1998 (JP) ............................................. 10-309923
Nov. 2, 1998 (JP) ............................................. 10-312552

(51) Int. Cl.[7] ............................. C08J 3/00; C08K 3/22; C08L 67/00; C08G 63/78; C08G 63/82

(52) U.S. Cl. ...................... 524/497; 524/601; 524/603; 528/279

(58) Field of Search ................................ 524/497, 601, 524/603; 528/279

(56) References Cited

U.S. PATENT DOCUMENTS

| | | | |
|---|---|---|---|
| 3,681,188 A | 8/1972 | Harris | ......................... 161/173 |
| 4,167,541 A | 9/1979 | Alexander | |
| 4,668,732 A | 5/1987 | Kuno et al. | |
| 5,656,716 A | 8/1997 | Schmidt et al. | |
| 5,798,433 A | 8/1998 | Schmidt et al. | |

FOREIGN PATENT DOCUMENTS

| | | |
|---|---|---|
| EP | 0547553 A1 | 6/1993 |
| EP | 0847960 A1 | 6/1998 |
| EP | 1209262 A1 | 5/2002 |
| GB | 766 849 | 9/1955 |
| JP | 53098/73 | 6/1975 |
| JP | 52-8124 | 1/1977 |
| JP | 60-112849 | 6/1985 |
| JP | 62-18423 | 1/1987 |
| JP | 7-216068 | 8/1995 |

OTHER PUBLICATIONS

Griebler, Dr. W.D., White Pigments for Man–Made Fibers—State of the Art, New Developments and Process Improvements, Man–Made Fiber Year Book (CTI) (1994); and Chemiefasern/Textilindustrie, vol. 44/96 (Oct. 1994).

Griebler, Dr. W.D., Updating Research and Development, 34th International Man–Made Fibres Congress (1995).

Ward, I.M. et al., The Mechanical Properties and Structure of Poly(m–methylene Terephthalate) Fibers, *Journal of Polymer Science*: Polymers Physics Edition, vol. 14, pp. 263–274 (1976).

EP Search Report.
Communication Pursuant to Article 115(2) EPC.

*Primary Examiner*—Patrick D. Niland
(74) *Attorney, Agent, or Firm*—Finnegan, Henderson, Farabow, Garrett & Dunner, L.L.P.

(57) ABSTRACT

A polyester resin composition containing, as a resin component, a polyester with its main component formed from a polytrimethylene terephthalate and having an intrinsic viscosity of 0.4 to 2, which satisfies the following conditions (1) to (3):

(1) the polyester resin composition is composed of a polyester resin component comprising 90% by weight or more of a polytrimethylene terephthalate;

(2) the polyester resin composition contains 0.01 to 3% by weight of titanium oxide having an average particle size from 0.01 to 2 $\mu$m; and (3) the polyester resin composition contains 25 or less/mg of the resin of agglomerates of titanium oxide particles which agglomerates have a lengthwise size exceeding 5 $\mu$m.

A polytrimethylene terephthalate-based polyester fiber, having a low frictional coefficient, excellent in wear resistance, and showing a suitable luster and a delustered effect, can be stably spun and drawn by applying a melt spinning method to the polyester resin composition. In addition, the resin composition is prepared by forming a 1,3-propanediol ester of terephthalic acid and/or its oligomer in the presence of a fine dispersion of titanium oxide in which the dispersion the agglomerates is controlled and subjecting the ester and/or its oligomer to a polycondensation reaction.

13 Claims, No Drawings

POLYESTER RESIN COMPOSITION AND FIBER

TECHNICAL FIELD

The present invention relates to a polytrimethylene terephthalate-based polyester resin composition containing titanium oxide, and a delustered polyester fiber prepared therefrom by melt spinning and manifesting an appropriate luster. The present invention relates in more detail to an improved polytrimethylene terephthalate fiber that can be obtained from a polymethylene terephthalate resin composition containing an improved fine dispersion of titanium oxide by spinning and drawing steps wherein a rise in the spinning pack pressure and decreases in the fiber strength and fiber wear resistance caused by aggregates of titanium oxide particles during the melt spinning step are significantly suppressed.

The present invention relates to a polytrimethylene terephthalate fiber which solves the problem of a high frictional coefficient specific thereto, and which consequently shows decreased yarn breakage and fluff formation during spinning and in the subsequent treatment steps, namely, which is excellent in spinnability.

BACKGROUND ART

A polytrimethylene terephthalate (hereinafter abbreviated to PTT) fiber is an epoch-making fiber that has such properties similar to those of a nylon fiber as a soft feeling derived from a low elastic modulus, an excellent elastic recovery and easy dyeability, and such properties similar to those of a polyethylene terephthalate fiber as a wash-and-wear property, dimensional stability and a yellowing-resistant property. Applications of the fiber to clothing, carpets and the like have been advanced.

When synthetic fibers represented by a polyethylene terephthalate (hereinafter abbreviated to PET) fiber, a nylon fiber and the like are to be used for clothing, the luster of the fibers is sometimes controlled by adding titanium oxide to the fibers in some applications (titanium oxide being used as a so-called delustering agent). For example, lusterous of lining cloth is not preferred by consumers. The fiber is therefore delustered by adding 0.2 to 1% by weight of titanium oxide thereto. A fiber for use in swimwear and foundation garments for women required to have a bright color is required not to lose luster by decreasing the amount of the titanium oxide.

As explained above, it also becomes necessary to change the luster of a PTT fiber for clothing and carpets by changing the addition amount of titanium oxide in accordance with its application. However, the present inventors have found for the first time, through their investigations, that there are serious problems, explained below, during the production of a PTT fiber containing titanium oxide.

That is, the most serious problem is that when titanium oxide is added to a PTT without a suitable control of the addition procedure, the polyester resin composition thus obtained contains a large amount of aggregates of titanium oxide. A PTT shows a higher tendency toward forming the aggregates than a PET and a polybutylene terephthalate (hereinafter abbreviated to PBT) that have structures similar to that of a PET.

When a resin composition containing many aggregates of titanium oxide is melt spun, the aggregates clog a filter with which the spinning nozzle pack is equipped to cause serious problems about the spinnability and spinning yield: the pressure within the spinning nozzle pack rises in a short period of time; the spinning nozzle orifices are likely to be fouled; and the frequency of the yarn breakage and fluff formation becomes high. Moreover, when the fiber thus obtained contains many coarse aggregates, the aggregates become defects, and as a result the fiber markedly lowers its strength and tends to form fluff.

Furthermore, the aggregates exert adverse effects on the wear resistance of PTT chips and a fiber prepared therefrom. A PTT resin composition differs from a PET or a PBT having a similar structure in that the PTT resin composition becomes highly crystalline chips when the resin composition is polymerized and rapidly cooled to form chips because the crystallization rate is high. Such chips are relatively brittle, and form powder when rubbed against each other during transportation, drying, extrusion within an extruder or the like treatment. It has been found that such a phenomenon is promoted by an increase in the number of aggregates. The formation of powder leads to a decrease in the yield due to a loss of the polymer, and an increase in the fluff caused by the air trapped in powder. On the other hand, such a phenomenon hardly takes place with PET or PBT because the crystallinity of the chips is low. Moreover, the aggregates also lower the wear resistance of the fiber. Since the molecules of a PTT fiber take a Z-shaped markedly bent conformation, the intermolecular force of the PTT fiber is low in comparison with that of the PET fiber or PBT fiber. As a result, the wear resistance of the PTT fiber becomes low. When the aggregates increase, the degree of decrease in the wear resistance becomes more significant. In contrast to the PTT fiber, the aggregates in the PET fiber and PBT fiber that take a conformation close to a fully extended structure do not exert as much adverse effect on the wear resistance as those in the PTT fiber.

A PTT containing titanium oxide has still another problem that the PTT forms large amounts of acrolein and allyl alcohol in comparison with a PTT substantially containing no titanium oxide due to thermal decomposition of the resin composition in the drying step prior to spinning. Since acrolein and allyl alcohol are chemical substances that have toxicity and a tearing property, and that harm the working environment, decreasing the generated amounts is an important problem.

The last problem is one that is associated with a property inherent to a PTT fiber, namely, the problem that a PTT fiber has a particularly large frictional coefficient among synthetic fibers. For example, a polyethylene terephthalate fiber of 50 d/36 f for general purposes having no finishing agent on the surface shows a fiber-metal frictional coefficient of 0.295, whereas a PTT fiber shows 0.378 under the same conditions. That is, the differences in the frictional coefficients are understandable when the following is considered: a PTT fiber has significant rubber-like properties in comparison with other synthetic fibers for general purposes.

As explained above, a PTT fiber has a significantly high frictional coefficient. Accordingly, when a PTT fiber is subjected to a treatment such as spinning and drawing, weaving or knitting, and false twisting, the fiber suffers a frictional resistance, to a very high degree, on guides and rolls in comparison with a PET fiber and a PBT fiber, and the PTT fiber tends to produce yarn breakage and fluff. However, methods for solving the above problems have never been disclosed.

For example, U.S. Pat. No. 5,798,433 discloses a method of using titanium oxide as a polymerization catalyst in an amount from 30 to 200 ppm in terms of titanium. However, the reference refers to neither a problem related to the dispersibility of titanium oxide, nor to a solution of the problem. The method is therefore inappropriate. Moreover, the titanium oxide used herein is an amorphous titanium oxide/silica coprecipitate coprecipitated by hydrolyzing a titanium alkoxide and a silanol, and shows a low delustering capacity and poor dispersibility because the coprecipitate differs in the chemical and crystal structures from crystalline titanium oxide used as a delustering agent. Moreover, since the amorphous titanium oxide/silica coprecipitate used in the reference is highly reactive, a side reaction takes place when added in an amount of 100 ppm or more to cause a problem that the polymer thus obtained is yellowed.

U.S. Pat. No. 3,681,188 discloses in examples a PTT containing 0.1% by weight of titanium oxide. However, there is no description referring to the technological significance of the dispersibility of titanium oxide.

Furthermore, Japanese Unexamined Patent Publication (Kokai) No. 62-18423 describes a method of preparing a titanium slurry for a polyester by making a substantial reference to a PET without a specific explanation for PTT. Still furthermore, in the method, a dispersion of titanium oxide is prepared by mixing, in ethylene glycol, titanium oxide, a strong acid of phosphoric acid and a strong base such as sodium hydroxide or tetraethylammonium hydroxide. However, these additives influence the surface of titanium oxide in 1,3-propanediol, and the aggregates tend to increase. There is no description suggesting means for solving the problems of the wear and frictional coefficient of a PTT fiber and decomposition products that arise when titanium oxide is added to a PTT fiber.

DISCLOSURE OF THE INVENTION

An object of the present invention is to provide a titanium oxide-containing PTT resin composition from which a PTT fiber excellent in wear resistance and having a decreased frictional coefficient can be spun under a spinning and drawing operation wherein the luster is adjusted, and a rise in the pack pressure, yarn breakage, formation of fluff and lowering of the fiber strength and wear resistance are suppressed during spinning. A specific object of the present invention is to provide a PTT resin composition containing a fine dispersion of titanium oxide and prepared by using a dispersion of titanium oxide in 1,3-propanediol in which formation of titanium oxide agglomerates is suppressed and by polymerizing while formation of titanium oxide agglomerates is being suppressed.

Another specific object of the present invention is to provide a PTT resin composition most suitable for fiber production in which generation of byproducts such as acrolein and allyl alcohol is inhibited in the drying step prior to spinning in comparison with a PTT resin composition substantially containing no titanium oxide.

A more specific object of the present invention is to provide a polymerization technology for obtaining a PTT that solves the above problems by adding a specific stabilizer during polymerization, and the resin composition thus obtained and the fiber thereof.

The present inventors have found that when a dispersion of titanium oxide obtained by sufficiently dispersing titanium oxide in a solvent in advance and simultaneously removing by-produced titanium oxide agglomerates is added at a polymerization stage of a PTT under specific conditions, a PTT resin composition containing a fine dispersion of titanium oxide can be obtained.

The present inventor's have also discovered that a PTT resin composition containing such a fine dispersion of titanium oxide causes no problems such as a rise in the pack pressure and a decrease in the fiber strength, improves the wear resistance, significantly decreases the frictional coefficient in comparison with a PTT containing no titanium oxide, and consequently shows excellent spinnability.

According to the present invention, conducting the above polycondensation in the presence of a phosphorus compound and/or a hindered phenol antioxidant gives a titanium oxide-containing composition that significantly decreases the amounts of acrolein and allyl alcohol formed during drying the resin composition.

The object of the present invention is solved by a polyester resin composition having an intrinsic viscosity of 0.4 to 2, which satisfies the following conditions (1) to (3):

(1) the polyester resin composition is composed of a polyester resin component comprising 90% by weight or more of a polytrimethylene terephthalate;

(2) the polyester resin composition contains 0.01 to 3% by weight of titanium oxide particles having an average particle size from 0.01 to 2 $\mu$m; and (3) the polyester resin composition contains 25 or less/mg of the resin of agglomerates of titanium oxide particles which agglomerates have a lengthwise size exceeding 5 $\mu$m.

Moreover, the polyester resin composition of the present invention is used in the form of a polyester fiber, a film, a molded article, etc. by applying the melt spinning method thereto. The resin composition is particularly useful as a fiber.

The PTT resin composition of the present invention is composed of a polyester resin comprising 90% by weight or more of a PTT. The PTT herein designates a polyester composed of a polytrimethylene terephthalate prepared from terephthalic acid as an acid component and 1,3-propanediol (also referred to as trimethylene glycol) as a diol component. The resin composition of the present invention and the PTT, which is a composition component of the fiber of the invention, may contain 10% by weight or less of one or more copolymer components, other polymers, inorganic substances and organic substances, based on the weight of the resin composition or fiber.

Examples of the copolymerization component that the PTT of the present invention can contain include ester-forming monomers such as 5-sodium sulfoisophthalic acid, 5-potassium sulfoisophthalic acid, 4-sodium sulfo-2,6-naphthalenedicarboxylic acid, 3,5-dicarboxybenzenesulfonic acid tetramethylphosphonium salt, 3,5-dicarboxybenzenesulfonic acid tetrabutylphosphonium salt, 3,5-dicarboxybenzenesulfonic acid tributylmethylphosphonium salt, 2,6-dicarboxynaphtalene-4-sulfonic acid tetrabutylphosphonium salt, 2,6-dicarboxynaphtalene-4-sulfonic acid tetramethylphosphonium salt, 3,5-dicarboxybenzenesulfonic acid ammonium salt, 1,2-butanediol, 1,3-butanediol, 1,4-butanediol, neopentyl glycol, 1,5-pentamethylene glycol, 1,6-hexamethylene glycol, heptamethylene glycol, octamethylene glycol, decamethylene glycol, dodecamethylene glycol, 1,4-cyclohexanediol, 1,3-cyclohexanediol, 1,2-cyclohexanediol, 1,4-cyclohexanedimethanol, 1,3-cycloheanedimethanol, 1,2-cyclohexanedimethanol, oxalic acid, malonic acid, succinic acid, glutaric acid, adipic acid, pimelic acid, suberic acid, sebacic acid, dodecanedioic acid, 2-methylglutaric acid, 2-methyladipic acid, fumaric acid, maleic acid, itaconic acid, 1,4-cyclohexanedicarboxylic acid, 1,3- cyclohexanedicarboxylic acid and 1,2-cyclohexanedicarboxylic acid. Moreover, even when copolymerization is not positively carried out, bis(3-hydroxypropyl) ether formed by dimerizing 1,3-propanediol is copolymerized in a copolymerization ratio of 0.01 to 2% by weight because a dimer formed by dehydration dimerization of 1,3-propanediol as a side reaction during polymerization is copolymerized in the polymer main chain.

The polymer forming the polyester resin composition of the present invention must have an intrinsic viscosity [η] (also termed a limiting viscosity number) of 0.4 to 2.0. When the intrinsic viscosity is less than 0.4, the resin composition shows unstable spinnability in addition to a low strength of the fiber thus obtained because the resin composition has an excessively low polymerization degree. Conversely, when the intrinsic viscosity exceeds 2.0, the resin composition cannot be measured smoothly at a gear pump because the melt viscosity is excessively high, and the resin composition shows lowered spinnability due to a poor discharge of the resin composition. The intrinsic viscosity is preferably from 0.6 to 1.5, particularly preferably from 0.6 to 1.4. A PTT fiber excellent in strength and spinnability can then be obtained.

The polyester resin composition of the present invention must contain titanium oxide having an average particle size of 0.01 to 2 μm in an amount of 0.01 to 3% by weight based on the resin composition or fiber weight from the standpoint of increasing the delustering effect and decreasing the frictional coefficient. The titanium oxide used in the present invention may be either an anatase or a rutile type. Moreover, the titanium oxide may be surface treated with an inorganic substance such as alumina and silica, or an organic group such as a hydrocarbon group and a silyl group. The titanium oxide used in the present invention preferably has a crystallinity index of 50% or more, more preferably 70% or more. The crystal system of the titanium oxide is preferably the anatase type because the titanium oxide has a low hardness and a high wear resistance and because it shows good dispersibility in 1,3-propanediol. Moreover, in order to inhibit the optical decomposition caused by titanium oxide, the resin composition may contain 0.1 to 1% by weight of antimony based on titanium oxide. Moreover, titanium oxide is once dispersed in water or an organic solvent such as alcohol so that the aggregates are removed, and the resultant titanium oxide may be used. Use of usual commercially available titanium oxide for synthetic fibers is preferred. The titanium oxide must have an average particle size from 0.01 to 2 μm, particularly preferably from 0.05 to 1 μm. Titanium oxide having an average particle size of less than 0.01 μm can be hardly obtained practically. Moreover, titanium oxide having an average particle size exceeding 2 μm tends to clog the filter of a spinning nozzle pack. As a result, the filtering pressure rises in a short period of time, and the spinning nozzle orifices are easily fouled; therefore, the spinning nozzle surface must often be cleaned. Although there is no specific limitation on the particle distribution of titanium oxide to be used, titanium oxide containing particles with a particle size of 1 μm or more in an amount of 20% by weight or less based on the entire titanium oxide is preferred, and titanium oxide containing particles of 1 μm or more in an amount of 10% by weight or less based thereon is particularly preferred from the standpoint of suppressing a rise in the spinning nozzle pack pressure.

In the present invention, the resin composition is made to contain titanium oxide for the purpose of adjusting the luster of the fiber thus obtained to a desired degree in accordance with the application and lowering the frictional coefficient of the fiber. A necessary luster can be given to the fiber by changing the amount of titanium oxide. When the luster is intended to be heightened, the content of titanium oxide is determined to be about from 0.01 to 0.1% by weight, preferably from 0.03 to 0.07% by weight. When the luster is desired to be heightened, the content thereof may be made extremely close to zero. However, when the luster is high, the product becomes glittering, and comes to have a cheap appearance. Accordingly, when the luster is desired to be heightened, the content of titanium oxide must be 0.01% by weight or more. When the luster is desired to be suppressed, the content should be from 0.1 to 1% by weight, from 1 to 3% by weight when the luster is desired to be particularly suppressed.

The frictional coefficient of the fiber is lowered to a degree as much as several tens of percent by the addition of titanium oxide though the degree depends on the addition amount thereof. The phenomenon of such a significant decrease in a frictional coefficient is specifically observed in a PTT fiber, but not observed in a PET or PBT fiber. The content of titanium oxide is important from the standpoint of lowering a frictional coefficient. When the content of titanium oxide in the fiber becomes less than 0.01% by weight, the effect of decreasing a frictional coefficient becomes insignificant. Conversely, when the content exceeds 3% by weight, the frictional coefficient is no longer lowered. The content is preferably from 0.03 to 2% by weight, more preferably from 0.04 to 2% by weight.

The polyester resin composition of the present invention must contain 25 or less/mg of the resin (the unit indicating a number of agglomerates contained in 1 mg of the resin composition) of agglomerates of titanium oxide particles which agglomerates have a lengthwise size exceeding 5 μm. The number of the agglomerates is a numerical value measured by the procedure described later in [2] Measurement of Titanium Oxide Aggregates. When the condition is satisfied, titanium oxide in the polyester resin composition or fiber of the invention can be highly dispersed. As a result, the following can be achieved: reduction of a brittleness of the resin composition; and lowering a wear resistance, suppression of fluff formation and yarn breakage and reduction of a frictional coefficient of the fiber In addition, an aggregate in the present invention is defined as a group of titanium oxide particles (countable as one) formed from titanium oxide particles that are present in a polyester resin composition or a fiber, or in a dispersion of titanium oxide to be added to reactants for producing the resin composition or fiber and that substantially adhere to each other. Such aggregates have various shapes. In order to solve the above problems, those aggregates which have a lengthwise size exceeding 5 μm must be in a specific amount or less.

The aggregates and dispersed state of titanium oxide can be confirmed by optical-microscopically observing a film obtained by thinly melting the resin composition. When the number of the aggregates in the resin composition exceeds 25/mg of the resin, there arise the following problems: the resin composition is embrittled; the spinning nozzle pack pressure tends to rise in a short period of time; the spinning nozzle orifices are likely to be fouled; and yarn breakage and fluff formation consequently tend to take place, and stabilized industrial production cannot be conducted. Moreover, the frictional coefficient of the fiber thus obtained becomes high. The number is preferably 15 or less/mg of the resin, more preferably 10 or less/mg of the resin, most preferably 5 or less/mg of the resin or less. The number of the aggregates in the fiber obtained from the resin composition is preferably 7 or less/mg of the fiber (the unit indicating a number of agglomerates contained in 1 mg of the fiber), more preferably 3 or less/mg of the fiber, most preferably 1 or less/mg of the fiber. The present inventors have devised the following method of evaluating a magnitude of a rise in the spinning nozzle pack pressure in a short period of time: a spinning nozzle pack wherein the internal filtering area is decreased, and several fine mesh filters are stacked is prepared; and a molten resin composition is passed through the spinning nozzle pack. Examining the method, they have found that the degree of a rise in the pack pressure in a given period of time corresponds to a number of the aggregates. When the aggregates increase, the aggregates that clog the filter increase to raise the spinning nozzle pack pressure in a short period of time. Conversely, when the aggregates are few, the rise in the spinning pack pressure becomes extremely small. For example, a polyester resin composition melted at 265° C. with an extruder and having a moisture content of 100 ppm or less is passed through a layer of sand (a filter area of 660 mm$^2$ and a thickness of 2 cm) that can pass through a filter of 20 mesh but cannot pass through a filer of 28 mesh. The polyester resin composition is then consecutively passed through the following five filters each having a filtering area of 660 mm$^2$: (1) a filter having a pore size of 50 mesh; (2) a filter having a pore size of 150 mesh; (3) a filter having a pore size of 300 mesh; and (4) a sintered filter having a pore size of 20 µm; and (5) a filter having a pore size of 50 mesh. The resin composition is then passed through a spinning nozzle having 12 orifices having a diameter of 0.23 mm at a discharging rate of 25 g/min to be discharged into the air. The pressure applied to the resin composition when the resin composition is made to enter the sand layer after being extruded by the extruder is measured 5 hours and 20 hours after starting the discharging, and a rise in the pressure is determined. It has been found that when the pressure rise is 40 kg/cm$^2$ or less, using an industrial spinning apparatus (the filtering area then being much larger than that in the model test), the spinning nozzle pack pressure rises at such a low rate that spinning and drawing can be stably conducted to give a fiber excellent in quality. The rise in the pressure of 40 kg/cm$^2$ or less approximately corresponds to the upper limit of the number of aggregates in the resin composition, namely, 25 or less/mg defined in the present invention. When the rise in the pressure exceeds 40 kg/cm$^2$, yarn breakage often takes place and much fluff is formed. Moreover, the spinning nozzle orifices tend to be fouled, and the effect of lowering the frictional coefficient of the fiber surface becomes insignificant. Although a smaller rise in the pressure is preferred, the rise in the pressure is preferably 30 kg/cm$^2$ or less, particularly preferably 20 kg/cm$^2$ or less.

The polyester resin composition or the fiber thereof in the present invention preferably contains a phosphorus compound in an amount of 5 to 250 ppm as phosphorus based on the weight of the resin composition or fiber. It is known that a PTT is partially decomposed though the amount is slight and acrolein and allyl alcohol are formed when dried or heated for a long period of time at temperature of 100° C. or more. However, according to the investigation by the present inventors, a PTT composition containing titanium oxide used as a delustering agent has been found to produce such decomposed products in a markedly large amount in comparison with a PTT containing no titanium oxide. Moreover, the present inventors have found that when the resin composition is made to contain a phosphorus compound, the formation amount of the decomposed products can be greatly reduced. Moreover, a phosphorus compound thus added produces a significant effect on the prevention of coloring and improvement of melt stability of the resin composition or fiber in each of the steps from polymerization to production of clothing, and in each of the stages such as melt polymerization, solid phase polymerization, drying chips at high temperature, melt spinning, scouring, heat setting and dying.

An organic phosphorus compound is preferred as the phosphorus compound. A phosphate of the chemical formula O=P(OR$^1$)(OR$^2$)(OR$^3$) or a phosphite of the chemical formula P(OR$^4$)(OR$^5$)(OR$^6$) wherein R$^1$, R$^2$, R$^3$, R$^4$, R$^5$ and R$^6$ are independent of each other, and are each selected from a hydrogen atom, an organic group of 1 to 30 carbon atoms, an alkali metal and an alkaline earth metal, is particularly preferred because the compounds are excellent in inhibiting the formation of acrolein and allyl alcohol, preventing coloring and improving the melting stability, and exert no adverse influence on the spinnability. When any of R$^1$, R$^2$, R$^3$, R$^4$, R$^5$ and R$^6$ is an organic group of 1 to 30 carbon atoms, a part of or the whole of the hydrogen atoms may be replaced with halogen atoms, ester groups, carboxy groups, amide groups, amino groups, imide groups, ether bonds and the like.

Preferred specific examples of the phosphorus compounds include trimethyl phosphate, triethyl phosphate, tripropyl phosphate, tributyl phosphate, tripentyl phosphate, trihexyl phosphate, triheptyl phosphate, trioctyl phosphate, dimethylethyl phosphate, dimethyl phosphate, methyl phosphate, 3-hydroxypropyl phosphate, bis(3-hydroxypropyl) phosphate, tris(3-hydroxypropyl) phosphate, triphenyl phosphate, trimethyl phosphite, triethyl phosphite, tripropyl phosphite, tributyl phosphite, tripentyl phosphite, trihexyl phosphite, triheptyl phosphite, trioctyl phosphite, dimethylethyl phosphite, dimethyl phosphite, methyl phosphite, 3-hydroxypropyl phosphite, bis(3-hydroxypropyl) phosphite, tris(3-hydroxypropyl) phosphite, triphenyl phosphite, sodium phosphate, potassium phosphate, magnesium phosphate, calcium phosphate, dimethyl sodium phosphate, methyl disodium phosphate, phosphoric acid, phosphorous acid and ethyl diethylphosphonoacetate. In view of the excellent effects of coloring prevention and melt stability and a poor capacity for hindering polymerization, trimethyl phosphate, triethyl phosphate, tripropyl phosphate, phosphoric acid, phosphorous acid and ethyl diethylphosphonoacetate are particularly preferred.

The amount of a phosphorus compound contained in the polyester resin composition or fiber of the present invention can be shown by the weight fraction of phosphorus contained in the resin composition or fiber. The amount is preferably from 5 to 250 ppm. When the amount is less than 5 ppm, the effects of inhibiting the formation of decomposition products cannot be adequately achieved. When the amount exceeds 250 ppm, the effects can be sufficiently achieved; however, the polymerization catalyst is partially inactivated, and melt polymerization or solid phase polymerization hardly proceeds. The weight fraction is preferably from 35 to 150 ppm, more preferably from 50 to 120 ppm.

In order to inhibit the formation of acrolein and allyl alcohol, prevent coloring and achieve the improvement of melt stability, it is also preferable to add a hindered phenol antioxidant to the polyester resin composition and the fiber of the present invention. Use of a phosphorus compound explained above in combination is naturally preferable. A known substance may be used as such a hindered phenol antioxidant. Examples of the antioxidant include pentaerythritol tetrakis[3-(3,5-di-tert-butyl-4-hydroxy-phenyl)

propionate], 1,1,3-tris(2-methyl-4-hydroxy-5-tert-butylphenyl)butane, 1,3,5-trimethyl-2,4,6-tris(3,5-di-tert-butyl-4-hydroxybenzyl)benzene, 3,9-bis{2-[3-(3-tert-butyl-4-hydroxy-5-methylphenyl)propionyloxy]-1,1-dimethylethyl}-2,4,8,10-tetraoxaspiro[5,5]undecane, 1,3,5-tris(4-tert-butyl-3-hydroxy-2,6-dimethylbenzene) isophthalic acid, triethylglycol bis[3-(3-tert-butyl-5-methyl-4-hydroxyphenyl)propionate], 1,6-hexanediol bis[3-(3,5-di-tert-butyl-4-hydroxyphenyl)propionate], 2,2-thiodiethylene-bis[3-(3,5-di-tert-butyl-4-hydroxyphenyl)propionate] and octadecyl-3-(3,5-di-tert-butyl-4-hydroxyphenyl)propionate. Of these compounds, pentaerythritol tetrakis[3-(3,5-di-tert-butyl-4-hydroxyphenyl)propionate], octadecyl-3-(3,5-di-tert-butyl-4-hydroxyphenyl)propionate and the like are preferred.

The hindered phenol antioxidant is used preferably in an amount of 0.002 to 2% by weight based on the weight of the resin composition or fiber for the following reasons: when the amount exceeds 2% by weight, the resin composition or fiber is sometimes colored, and the capacity of the antioxidant for improving the melt stability is saturated; moreover, when the amount is less than 0.002% by weight, the effect of inhibiting the generation of acrolein and allyl alcohol is insignificant. The amount is preferably from 0.02 to 1% by weight.

Furthermore, when a cobalt compound is contained in the polyester resin composition and a fiber prepared therefrom of the present invention, the cobalt compound shows the effect of significantly increasing the whiteness of the resin composition and fiber thus obtained in addition to the effect of inhibiting the formation of acrolein and allyl alcohol. Examples of the cobalt compound that can be used include cobalt acetate, cobalt formate, cobalt carbonate and cobalt propionate. Such a cobalt compound is used preferably in an amount of 1 to 25 ppm based on the weight of the resin composition and fiber. When the amount is less than 1 ppm, the effects of inhibiting the generation of decomposed products and improving the whiteness are not shown sufficiently. When the amount exceeds 25 ppm, the resin composition and fiber become darkened and dull, and the application is limited. The amount is preferably from 2 to 30 ppm, more preferably from 3 to 15 ppm.

The polyester resin composition of the present invention may optionally be copolymerized or mixed with various additives such as delustering agents other than titanium oxide, heat stabilizing agents, defoaming agents, orthochromatic agents, flame retardants, antioxidants, ultraviolet ray absorbers, infrared ray absorbers, nucleating agents and brighteners.

Although there is no specific limitation on the process for producing the polyester resin composition of the present invention, a preferred process will be explained below.

The polyester resin composition of the present invention can be obtained by a process for producing a polyester, wherein dicarboxylic acid mainly containing terephthalic acid or a lower alcohol ester derivative of terephthalic acid such as dimethyl terephthalate is reacted with 1,3-propanediol to form a 1,3-propanediol ester of terephthalic acid and/or an oligomer thereof, and the ester and/or oligomer is subjected to polycondensation reaction to give a polyester, the process comprising adding a dispersion of titanium oxide obtained by adding once titanium oxide in a solvent, stirring the mixture, and removing agglomerates of titanium oxide particles, at an optional stage selected from the start of the reaction to the completion of the polycondensation reaction, and then completing the polycondensation reaction.

What is important herein is the method of preparing the dispersion of titanium oxide in which the agglomerates are removed.

First, titanium oxide in powder is added to a solvent so that the mixture contains from 0.1 to 70% by weight of titanium oxide, and then the mixture is sufficiently stirred to give a liquid in which titanium oxide is uniformly dispersed in appearance. A preferred content of titanium oxide in the solvent is from 10 to 50% by weight. Moreover, there is no specific limitation on the solvent to be used, and 1,3-propanediol, ethylene glycol, 1,4-butanediol, methanol, toluene, etc. can be used. However, 1,3-propanediol is particularly preferred. Although there is no specific limitation on the stirring procedure, efficient stirring is preferable. For example, stirring with a high speed mixer, a homogenizer or a kneader is preferable. Moreover, an operation of pulverizing agglomerates with a ball mill, a bead mill or the like may also be conducted after stirring. A stirring period from 10 minutes to 48 hours is preferred.

Although the dispersion of titanium oxide thus obtained is uniform in appearance, the dispersion contains a large amount of agglomerates of titanium oxide particles. For example, when the dispersion is microscopically observed, agglomerates of titanium oxide are observed here and there. Even when a PTT is prepared by polymerization using a dispersion of titanium oxide in such a state, only a resin composition that will increase the spinning nozzle pack pressure at a high rate can be obtained because the resin composition contains a large amount of titanium oxide agglomerates. Although the agglomerates can be mechanically pulverized, an operation of removing the agglomerates from the dispersion is more efficient, simpler and more economical than the pulverization thereof.

A dispersion of titanium oxide in which titanium oxide is uniformly dispersed in appearance must be subsequently subjected to an operation of removing the agglomerates. A known operation of removing the agglomerates such as centrifugal separation and filtering with a filter can be employed. Since centrifugal separation is efficient and most simple, it is the best method for removing agglomerates. There is no specific limitation on a centrifugal separator to be used. It may be either of a continuous or batch type.

It is a rotation speed and a time period of the operation to which attention must be paid when centrifugal separation is conducted. When the centrifugal operation is conducted at an excessively high speed over a long period of time, a fine dispersion of titanium oxide is also centrifugally separated and removed from the dispersion. Conversely, when the rotation speed is excessively slow or the operating time period is excessively short, the separation becomes inadequate. The rotation speed is preferably 5000 rpm or more, particularly preferably from 2,000 to 10,000 rpm. The operation time period is preferably from 2 to 90 minutes. When the dispersion is filtered with a filter, the pore size of the filter used is preferably from 200 to 2,000 mesh, particularly preferably from 300 to 700 mesh. In the filtering operation, the dispersion may be filtered through a plurality of filters, or it may be filtered through the same filter a plurality of times. There is no specific limitation on the type of the filter. Examples of the filter include a metallic filter, a ceramic filter and an organic substance-made filter such as an unwoven fabric filter.

Each of the agglomerates of titanium oxide thus removed is one formed by gathering titanium oxide particles and having a lengthwise size exceeding 5 $\mu$m. The agglomerates are preferably removed as much as possible. The content of titanium oxide in the fine dispersion of titanium oxide thus obtained is preferably from 10 to 30% by weight.

The detail of the polymerization conditions will be explained. A known polymerization method can be basically used as the polymerization method.

That is, dicarboxylic acid mainly containing terephthalic acid or a lower alcohol ester derivative of terephthalic acid such as dimethyl terephthalate is reacted with 1,3-propanediol at temperature from 200 to 240° C., and the reaction products are subjected to a polycondensation reaction at temperature from 250 to 290° C., preferably from 260 to 290° C. under reduced pressure of 1 torr or less, preferably 0.5 torr or less to give a desired resin composition.

The molecular ratio of dicarboxylic acid mainly containing terephthalic acid or a lower alcohol ester derivative of terephthalic acid such as dimethyl terephthalate to 1,3-propanediol during charging is from 1:1.3 to 1:3, preferably from 1:1.5 to 1:2.5. When an amount of 1,3-propanediol is less than that defined by the ratio 1:1.3, the reaction time is greatly prolonged, whereby the resin composition is colored. Moreover, when an amount of 1,3-propanediol is more than that defined by the ratio 1:3, an amount of bis(3-hydroxypropyl) ether thus formed increases. In order to react dicarboxylic acid mainly containing terephthalic acid or a lower alcohol ester derivative of terephthalic acid such as dimethyl terephthalate with 1,3-propanediol, use of a catalyst is preferred. Preferred examples of the catalyst include titanium alkoxides represented by titanium tetrabutoxide and titanium tetraisopropoxide, cobalt acetate, calcium acetate, magnesium acetate, zinc acetate, titanium acetate, amorphous titanium oxide precipitates amorphous titanium oxide/silica coprecipitates and amorphous titanium oxide/zirconia coprecipitates. One or more of the catalysts are used. The amount of a catalyst for the ester interchange reaction is preferably from 0.02 to 0.15% by weight.

The polycondensation catalyst must be used without fail. Examples of the polycondensation catalyst include titanium alkoxides represented by titanium tetrabutoxide and titanium tetraisopropoxide, antimony acetate and antimony trioxide. Since the reaction rate is high when titanium alkoxides represented by titanium tetrabutoxide and titanium tetraisopropoxide are used, they are particularly preferred. The amount of a catalyst for the polycondensation reaction is preferably from 0.03 to 0.15% by weight.

Phosphorus compounds, hindered phenol antioxidants and cobalt compounds used in the present invention may be added at any stage during polymerization. They may be added at a time or in several times. However, a phosphorus compound is preferably added after the ester interchange reaction finishes because the addition does not hinder the reaction and it inhibits the coloration of the resin composition. In addition, when the reactant temperature exceeds the boiling point of the phosphorus compound, addition of the compound in a predetermined amount cannot be achieved if the compound is added at the reactant temperature because the compound is evaporated. In such a case, the following procedure is particularly preferred: the phosphorus compound is once dissolved in 1,3-propanediol at temperature of 50° C. or more, and reacted therewith to raise the boiling point; and then the phosphorus compound is added. When such a procedure is employed, a desired amount of phosphorus can be applied to the resin composition. Moreover, a cobalt compound may also be used as a catalyst.

The dispersion of titanium oxide in which agglomerates of titanium oxide particles have been removed is preferably added after adding the catalyst, phosphorus compound, hindered phenol antioxidant and cobalt compound for reasons explained below. When the dispersion is added first and the above substances are added, local changes in pH of the dispersion occur significantly at the surface portions of the polymer where the catalyst, phosphorus compound, hindered phenol antioxidant and cobalt compound contact. As a result, the shock of the changes in pH may make the titanium oxide aggregate. Accordingly, the following procedure is preferred: after adding the catalyst, phosphorus compound, hindered phenol antioxidant and cobalt compound, the mixture is adequately stirred for 1 minute or more, and the dispersion of titanium oxide in which agglomerates have been removed is removed is added to the reaction mixture. Moreover, when the addition temperature exceeds 250° C., titanium oxide may agglomerate due to a thermal shock. Therefore, titanium oxide is preferably added at temperature of 250° C. or less.

The polyester resin composition thus obtained is taken out of the polymerizer when the intrinsic viscosity reaches a predetermined value, and changed into a solid material. In order to remove titanium oxide aggregates formed during polymerization, the aggregates may be removed by equipping the polymerizer with a filter; moreover, this equipment is preferred. Although there is no specific limitation on the filter then used, a filter of 100 to 2,000 mesh is preferred.

The polyester resin composition can usually be made to have an intrinsic viscosity from about 0.4 to 0.9, and an object of the present invention is achieved. Making the polyester resin composition have an intrinsic viscosity exceeding 0.9 sometimes becomes difficult for the following reasons. When the reaction temperature is raised in order to increase the intrinsic viscosity, thermal decomposition of the polyester resin composition sometimes takes place and the viscosity then hardly rises. A preferable procedure of attaining an intrinsic viscosity of 0.9 or more is to conduct solid phase polymerization. When solid phase polymerization is conducted, the intrinsic viscosity can be increased to 2.0. A resin composition in the form of chips, powder, fibers, plates or blocks can be solid phase polymerized in an atmosphere of inert gas such as nitrogen or argon, or under a reduced pressure of 1000 torr or less, preferably 10 torr or less at temperature of 170 to 220° C. for 3 to 4 hours.

The polyester fiber of the present invention is one having an intrinsic viscosity from 0.4 to 2, which satisfies the following conditions (1) to (4):

(1) the polyester fiber is composed of a polyester resin component comprising 90% by weight or more of polytrimethylene terephthalate;

(2) the polyester fiber contains from 0.01 to 3% by weight of titanium oxide having an average particle size of 0.01 to 2 μm;

(3) the polyester fiber contains 12 or less/mg of the fiber of agglomerates of titanium oxide particles which agglomerates have a lengthwise size exceeding 5 μm; and (4) the polyester fiber has a birefringent index of 0.03 or more.

Since the polyester fiber satisfies these conditions, the fiber is suitably delustered, has a decreased frictional coefficient and an improved wear resistance, and shows decreased occurrence of fluffs and breakages of filaments.

Of the conditions essential to the polyester fiber of the present invention, the conditions (1) and (2) are the same as those of the resin composition of the invention. The conditions (3) and (4) will therefore be explained.

The polyester fiber of the invention must contain 12 or less/mg of the fiber of agglomerates of titanium oxide particles which agglomerates have a lengthwise size exceeding 5 μm. The number of aggregates is a numerical value determined by the measurement in [2] Measurement of Titanium Oxide Aggregates in Examples. When the number of the aggregates exceeds 12/mg of the fiber, the wear resistance of the fiber is lowered, and fluff formation and single yarn breakage are likely to take place. A fiber in such a state of course shows low spinnability and drawability and a low spinning yield. The number is preferably 7 or less/mg of the fiber, more preferably 3 or less/mg of the fiber, most preferably 1 or less/mg of the fiber.

The polyester fiber of the present invention must have a birefringent index of 0.03 or more. The birefringent index is a parameter showing the orientation of a polymer chain in the fiber in the fiber axis direction when the birefringent index is less than 0.03, the orientation of the polymer chain of the fiber thus obtained becomes insufficient, and the polymer chain remains in a mobile state. As a result, the frictional coefficient of the fiber increases, and the wear resistance of the fiber lowers. An object of the present invention therefore cannot be achieved. Moreover, even when the fiber is stored at about room temperature, the physical properties of the fiber change with time. When a fabric is prepared from such a fiber that tends to change its structure as explained above, the fabric tends to show uneven dyeing and show uneven physical properties because the fabric changes its dye-affinity and physical properties while being stored. In order to completely solve such problems, the birefringent index is preferably 0.05 or more, more preferably 0.06 or more. Moreover, since the orientation of a fiber is insufficient when the birefringent index is from 0.03 to 0.06, a finished yarn having bulkiness and stretchability can be provided by twisting or false-twisting the yarn while the yarn is being stretched.

The shape of the polyester fiber of the present invention may be either a long fiber or a short fiber. Moreover, when the shape is a long fiber, the fiber may be either of multifilaments or monofilament. The fiber may also be treated to give an unwoven fabric by spun bonding, microwaving or the like procedure.

Furthermore, the polyester fiber of the present invention can include any or all the structures used for conventional synthetic fibers such as a stretched yarn obtained by a conventional method, direct drawing, high speed spinning or the like method, a semi-stretched yarn (so-called POY) used for false twisting and various finished yarns.

There is no specific limitation on the total denier. The total denier is from 5 to 1,000 d, and is particularly preferably from 5 to 200 d when the fiber is used for clothing. Although there is no specific limitation on the single yarn denier, the single yarn denier is preferably from 0.0001 to 10 d. The total denier may naturally be from 10 to 2,000 d when the fiber is used as a monofilament. Moreover, there is no specific limitation on the cross-sectional shape of the fiber. The shape may be round, triangular, flat, star-shaped, w-shaped or the like shape. The fiber may be solid or hollow.

The physical properties of the polyester fiber of the present invention will be explained below.

For example, when the fiber is a stretch yarn, the strength is 2.5 g/d or more, usually 3.5 g/d or more though the strength differs depending on the intrinsic viscosity and draw ratio. In particular, the most characteristic feature of the present invention with regard to the strength is that since the amount of agglomerates of titanium oxide particles is decreased and the melt stability of the raw material polymer is sufficiently enhanced, the molecular weight hardly lowers at the melting stage even when the intrinsic viscosity is increased, and a high strength can be manifested. Accordingly, the polyester fiber of the present invention can manifest a strength of 4 g/d or more when the intrinsic viscosity is about 0.7, and 5 g/d when the intrinsic viscosity is 1 or more. The fiber then shows an elongation of about 25 to 50%.

The marked feature of the polyester fiber of the invention is in the elastic modulus of the fiber. The fiber shows an elastic modulus as small as from 20 to 30 g/d. That the polyester fiber shows such a small elastic modulus signifies that the fabric has an extremely soft feeling. That the polyester fiber of the present invention is extremely excellent in an elastic recovery is also a marked feature thereof. Even when the fiber is elongated by about 15%, the fiber recovers to approximately 100% of the original length. When the fiber is elongated by 20%, the fiber usually shows an elastic recovery of 70% or more, and greater than 80% in some cases. Accordingly, the polyester fiber of the present invention can be made to provide a fabric having a soft feeling and a good stretchability while having appropriate luster and strength suitable for the application. Moreover, since titanium oxide is significantly excellent in dispersibility, it lowers the frictional coefficient, suppresses the phenomenon that the fiber is caught by a guide or a roll to increase the spinnability. Furthermore, since the titanium oxide forms no aggregate defects, the fiber becomes excellent in wear resistance.

The polyester fiber of the present invention can be produced by applying a known method of spinning a PTT to the polyester resin composition of the invention explained above. For example, it is particularly preferred to use, without modification, the spinning method disclosed in International Publication Nos. WO 99/11845 and WO 99/21768 by the present inventors. That is, the polyester fiber of the present invention can be obtained by the following procedure: the resin composition of the invention having been dried to have a moisture of 100 ppm or less, preferably 50 ppm or less is melted using an extruder or the like; the molten resin composition is extruded from a spinning nozzle; and the extruded yarn is wound and stretched. That the extruded yarn is wound and elongated indicates the so-called conventional method and the so-called direct drawing method which are explained below. In the conventional method, the spun yarn is wound on bobbin, etc., and the wound yarn is then stretched with another apparatus. In the direct drawing method wherein the spinning step and stretching step are directly connected, the resin composition having been extruded from a spinning nozzle is completely cooled and solidified, and the resultant yarn is wound on a first roll rotating at a constant speed several times or more so that the tension before and after the roll is not transmitted at all; the yarn is then stretched between the first roll and a second roll installed subsequent thereto.

When the polyester fiber of the present invention is used singly or as a part of a fabric, it gives a fabric excellent in softness, stretchability and a color developing property. When the fabric is used as a part of a fabric, there is no specific limitation on the fibers other than the fiber of the invention. However, when the fiber of the invention is particularly combined with fibers such as a stretch fiber, a cellulose fiber, wool, silk and an acetate fiber, the resultant fabric can manifest features such as a soft feeling and stretchability that a combined fabric in which a known synthetic fiber and a chemical fiber are used cannot give. The fabric herein refers to a woven or knitted fabric.

There is no specific limitation on the shape of and method of knitting or weaving the polyester fiber used for the fabric of the present invention including the above combined fabric, and known methods can be used. Examples of the fabric include a plain weave fabric for which the fiber is used as a warp or a weft, a woven fabric such as a reversible woven fabric and a knitted fabric such as a tricot and a raschel. Moreover, union twisting, doubling or interlacing may also be conducted.

The fabric of the present invention including a combined fabric may also be dyed. For example, the fabric can be dyed after knitting or weaving, by the conventional steps of scouring, presetting, dyeing with a disperse dye or a cationic dye and final setting. Moreover, the fabric can optionally be subjected to alkali reduction after scouring and before dying. In particular, when a cationic dye is to be used, the fiber of the fabric must be copolymerized with a sulfoisophthalic acid salt represented by 5-sulfoisophthalic acid in an amount from 1 to 3% by mole, preferably from 1.5 to 2.5% by mole based on the total carboxylic acid component.

The fabric can be scoured at temperature from 40 to 98° C. In particular, when the fabric is prepared by combining with a stretch fiber, the fabric is preferably scoured while being relaxed because the elasticity of the fabric is improved.

Although one or both of the heat setting procedures prior to and subsequent to dyeing can be omitted, both procedures are preferably carried out to improve the shape stability and dyeability of the fabric. The heat setting temperature is from 120 to 190° C., preferably from 140 to 180° C. The heat setting time is from 10 sec to 5 minutes, preferably from 20 sec to 3 minutes.

The fabric is dyed without using a carrier at temperature from 70 to 150° C., preferably from 90 to 120° C., particularly preferably from 90 to 100° C. In order to dye the fabric uniformly, it is particularly preferable to adjust the pH with acetic acid and sodium hydroxide in accordance with the dye, and simultaneously use a dispersant prepared from a surfactant.

The dyed fabric is then soaped or reduction cleaned by conventional procedures. For example, such a procedure can be carried out in an aqueous solution of alkali such as sodium carbonate and sodium hydroxide using a reducing agent such as sodium hydrosulfite.

BEST MODE FOR CARRYING OUT THE INVENTION

The present invention will be explained in more detail by making reference to examples. However, the present invention is not restricted to examples, etc. In addition, major measured values and evaluated values in examples were obtained by the measurement methods and evaluation methods explained below.

[1] Measurement of Intrinsic Viscosity

An Ostwald viscosity tube and o-chlorophenol at 35° C. are used, and the ratio of a specific viscosity $\eta_{sp}$ to a concentration C (g/100 ml) ($\eta sp/C$) is obtained. The ratio $\eta sp/C$ is extrapolated to the concentration of zero, and the intrinsic viscosity [$\eta$] is obtained by the formula:

$[\eta]=\lim(\eta sp/C)$

C→0

[2] Measurement of Titanium Oxide Aggregates

One milligram of a resin composition or a fiber is sandwiched between two cover glasses each 15×15 mm, and melted on a hot plate at temperature of (the melting point plus 20 to 30)° C. When the sample is melted, a load of 100 g is applied to the cover glasses to allow the sample to adhere to the cover glasses and spread it so that the molten sample is not squeezed out. The sample is rapidly cooled by placing the cover glasses in cold water. When the sample is rapidly cooled, the polymer is prevented from crystallizing, and the dispersed state of titanium oxide can be easily observed. The same operation is repeated five times, and 5 samples each sandwiched between two cover glasses are prepared.

Each of the resin composition samples spread between the two cover glasses is entirely observed with a magnification of 200× using an optical microscope. An aggregate of titanium oxide is larger than a dispersed titanium oxide particle. When an aggregate of titanium oxide particles observed through the microscope has a lengthwise size exceeding 5 $\mu$m, the aggregate is judged to be an aggregate of titanium oxide particles. The number of the thus judged aggregates is expressed in terms of a number per unit weight of the resin composition or fiber. The same observations are made of the entire five samples prepared, and the average value is defined as the number of aggregates (unit: number/mg of the resin or number/mg of the fiber).

[3] Measurements of Phosphorus and Cobalt in Polyester Resin Composition or Fiber The amounts of phosphorus and cobalt are measured with a high frequency plasma spectral analyzer (trade name of IRIS-AP, manufactured by Thermo Jarrel Ash).

A sample for the analysis is prepared as described below. In a conical flask were placed 0.5 g of a resin composition or fiber and 15 ml of concentrated sulfuric acid. The resin composition or fiber is decomposed on a hot plate at 150° C. for 3 hours, and further decomposed thereon at 350° C. for 2 hours. The contents are cooled, and oxidation decomposed by adding 5 ml of aqueous hydrogen peroxide to the contents. The liquid contents are concentrated to a volume of 5 ml; 5 ml of a concentrated hydrochloric acid/water (1:1) solution is added, and 40 ml of water is further added thereto to give an analysis sample.

[4] Measurement of Average Particle Size of Titanium Oxide

A raw material titanium oxide is dispersed in an aqueous solution containing 1 g/liter of sodium hexametaphosphate, and the average particle size of the titanium oxide is measured with a laser diffraction type/scattering type particle size distribution measurement apparatus (trade name of LA-920, manufactured by Horiba Limited).

The average particle size of titanium oxide in a resin composition or fiber is measured by the following procedure. The titanium oxide particles dispersed in the molten polymer within cover glasses, in the same manner as in [2] are microscopically observed. The average value of lengthwise sizes of 300 titanium oxide particles is defined as the average particle size. Since the average particle size of the raw material titanium oxide is approximately the same as that in the polymer in the present invention, either of the two methods may be used.

[5] Model Test of Spinning Nozzle Pack Pressure Rise Caused by Polyester Resin Composition A polyester resin composition melted at 265° C. with an extruder and having a moisture content of 100 ppm or less is passed through a layer of sand (a filter area of 660 mm$^2$ and a thickness of 2 cm) that can pass through a filter of 20 mesh but cannot pass through a filer of 28 mesh. The polyester resin composition is then consecutively passed through the following five filters each having a filtering area of 660 mm$^2$: (1) a filter having a pore size of 50 mesh; (2) a filter having a pore size of 150 mesh; (3) a filter having a pore size of 300 mesh; and (4) a sintered filter (trade name of DYNALLOY X-7, manufactured by US FILTER) having a pore size of 20 μm; and (5) a filter having a pore size of 50 mesh. The resin composition is then passed through a spinning nozzle having 12 orifices having a diameter of 0.23 mm at a discharging rate of 25 g/min to be discharged into, the air. The pressure applied to the resin composition when the resin composition is made to enter the sand layer after being extruded by the extruder is measured 5 hours and 20 hours after starting the discharging, and a rise in the pressure is determined. When the pressure rise is 40 kg/cm$^2$ or less, the spinning pack pressure rises to such a degree that causes no problem about spinning the resin composition on an industrial scale.

[6] Measurement of Amounts of Generated Acrolein and Allyl Alcohol

A resin composition or fiber is placed on a round furnace (a chlorine-sulfur measurement apparatus, trade name of TOX-10Σ, manufactured by Mitsubishi Chemical Corporation), and air at 130° C. is passed through the sample at a rate of 50 ml/min for 24 hours. The air is then introduced into a tube (filled with polyoxymethylene) immersed in a dry ice/acetone bath without leakage. Acrolein and allyl alcohol thus generated are trapped in the tube. The tube is then connected to a heating removal apparatus (trade name of FLS-1, manufactured by Shimazu Corporation), and heated to 200° C. from −30° C. to vaporize acrolein and allyl alcohol in the tube. The resultant gas is introduced into a GC/MS (in which a gas chromatography apparatus and a mass spectrum measurement apparatus are connected, trade name of QP-5000, manufactured by Shimazu Corporation, column: DB 624, 60 m), and measured at a heating rate of 10° C./min in the temperature range from 40 to 200° C. The amounts of trapped acrolein and allyl alcohol are thus determined. The amounts show those of acrolein and allyl alcohol (in terms of ppm based on the resin composition used) generated when 1 g of the resin composition or fiber is heated in an air stream at 130° C. for 24 hours.

[7] Method of Evaluating Spinnability of Resin Composition (Measurement of Fluff Ratio)

A polyester resin composition dried to have a moisture content of 50 ppm or less is melted at an extrusion temperature of 270° C., and passed through spinning nozzle orifices (36 orifices having a diameter of 0.23 mm). A finish oil composed of 52% by weight of isooctyl stearate, 27% by weight of oleyl ether, 11% by weight of sodium alkanesulfonate of 15 and 16 carbon atoms and 10% by weight of liquid paraffin having a Redwood viscosity of 130 sec is allowed to adhere to the filaments in an amount of 0.4 to 0.7% by weight based on the fiber weight. Melt spinning is thus conducted at a rate of 1,600 m/min, and the spun yarn is stretched by a hot roll at 55° C. and a hot plate at 140° C. The size and number of filaments of the yarn are set at 50 d and 36 f, respectively. One thousand pirns (500 g) are taken out, and the number of pirns that have fluff on the surface is counted. The number is divided by 1,000 and multiplied by 100 to give a fluff ratio (%).

[8] Dynamic Physical Properties (Strength, Ductility and Elastic Modulus)

The measurements are made in accordance with JIS L-1013.

[9] Measurement of Birefringent Index

The birefringent index is determined from retardation observed on the fiber surface using an optical microscope and a compensator, in accordance with a procedure described on page 969 of Handbook of Fiber-Raw Material Part (fifth impression, 1978, Maruzen Co., Ltd.).

[10] Measurement of an Elastic Recovery

A yarn is attached to a tensile tester with a chuck-to-chuck distance set at 20 cm. The yarn is then elongated at a tensile speed of 20 cm/min to have an elongation of 20%, and allowed to stand for 1 min. The yarn is subsequently shrunk at the same rate so that a stress-strain curve is depicted. The elongation of the yarn shown when the stress becomes zero during shrinkage is defined as a residual elongation (A). The elastic recovery is determined from the following formula:

elastic recovery (%)=((20-A)/20)×100

[11] Measurement of Frictional Coefficient

The fictional coefficient between a filament and a metal is herein determined. The measurement is made under the following conditions using a μ meter manufactured by Eiko Sokki K.K. A yarn to which a tension of 4 g/d is being applied is rubbed against an iron cylinder, as a frictional body, 25 mm in diameter and having a mirror-finished surface, at a speed of 100 m/min while the entrance direction of the yarn is made to make an angle of 90° with the exit direction thereof, in an atmosphere at 25° C. with an RH of 65%. The frictional coefficient μ of the yarn is determined from the following formula:

$\mu=(360\times2.3026/2\theta)\times\log_{10}(T_2/T_1)$ wherein $T_1$ is a tension on the entrance side of the frictional body (a tension corresponding to 0.4 g/denier), $T_2$ is a tension on the exit side of the frictional body, θ is a circular constant, and is 90°.

[12] Yarn Frictional Breakage Number

Portions of yarns are rubbed against other portions of the yarn, and the yarn frictional breakage number is expressed by a number of times a yarn tested is rubbed until yarn breakage takes place. The number is a measure of a wear resistance of the yarn. That is, when the number is larger, the wear resistance is better (hardly wears).

The yarn frictional breakage number is measured with a frictional holding force tester (No. 890, manufactured by Toyoseiki Seisakusho K.K.). Both ends of a yarn going through pulleys are tied to two respective clamps arranged. The clamps can be harmoniously reciprocated with a stroke distance of 20 mm. Each of the pulleys twists the yarn twice. A load of 50 g is applied to the yarn, and the clamps are reciprocated at a rate of 150 strokes/min. A number of the reciprocating motion can be counted by a counter, and a number counted until the yarn breakage takes place is defined as the yarn frictional breakage number.

REFERENCE EXAMPLE 1

Dispersions of titanium oxide particles used in examples explained below were prepared by the following procedures.

Procedure (1)

Anatase type titanium oxide having an average particle size of 0.5 μm was added to 1,3-propanediol in an amount of 20% by weight, and the mixture was stirred at a rate of 1,000 rpm for 10 hours.

Procedure (2)

Anatase type titanium oxide having an average particle size of 0.5 μm was added to 1,3-propanediol in an amount of 21% by weight, and the mixture was stirred at a rate of 1,000 rpm for 10 hours. The mixture was then centrifugally separated at a rate of 6,000 rpm for 25 minutes, and the supernatant alone was isolated. The content of titanium oxide in the treated solution was 20% by weight. When titanium oxide removed by the centrifugal separator was observed with an optical microscope, there were aggregates formed by gathering titanium oxide particles and having a lengthwise size exceeding 5 μm.

Procedure (3)

Anatase type titanium oxide having an average particle size of 0.5 μm was added to 1,3-propanediol in an amount of 21% by weight, and the mixture was stirred at a rate of 1,000 rpm for 10 hours. The mixture was subsequently passed through a 500-mesh filter three times. The content of titanium oxide in the treated solution was 20% by weight. When titanium oxide removed by the centrifugal separator was observed with an optical microscope, there were aggregates formed by gathering titanium oxide particles and having a lengthwise size exceeding 5 μm.

Procedure (4)

Anatase type titanium oxide having an average particle size of 0.5 μm was added to 1,3-propanediol in an amount of 21% by weight, and the mixture was stirred at a rate of 1,000 rpm for 10 hours. The mixture was subsequently passed through a 500-mesh filter once, and further subjected to centrifugal separation at a rate of 6,000 rpm for 25 minutes, followed by isolating the supernatant alone. The content of titanium oxide in the treated solution was 20% by weight. When titanium oxide particles removed by the centrifugal separator was observed with an optical microscope, there were aggregates formed by gathering titanium oxide particles and having a lengthwise size exceeding 5 μm.

EXAMPLES 1 TO 8

Terephthalic acid (hereinafter abbreviated to TPA) in an amount of 1,300 parts by weight was mixed with 1,369 parts by weight of 1,3-propanediol, and the acid was esterified under normal pressure at a heater temperature of 240° C. Titanium tetrabutoxide (0.1% by weight/TPA, the unit expressing a weight ratio on the basis of TPA), a phosphorus compound and/or a hindered phenol antioxidant shown in Table 1 and a dispersion of titanium oxide obtained in any of the procedures (2) to (4) in Reference Example 1 shown in Table 1 were consecutively added at time intervals of 5 minutes, and a polycondensation reaction was effected at 270° C. at 0.2 torr for 2.5 hours. In addition, the phosphorus compound and hindered phenol antioxidant were added to the polymerization system in the form of a 2 wt. % solution in 1,3-propanediol. Moreover, the amounts of phosphorus compounds, hindered phenol antioxidants and dispersions of titanium oxide expressed in terms of wt. % in the tables signify wt. % in the resin composition finally obtained. A resin composition thus obtained and having an intrinsic viscosity of 0.68 was drawn into water in a rope shape, and cut into chips. The chips were subjected to solid phase polymerization in a nitrogen atmosphere at 215° C. for 5 to 7 hours to give a polyester resin composition. The titanium oxide particles in the resin composition thus obtained had an average particle size of 0.5 μm.

Using the resin composition thus obtained, a stretch yarn was obtained by the spinning procedure in [7]. Table 2 shows the physical properties of the yarn. The number of aggregates of titanium oxide particles and the frictional coefficient in any of Examples 1 to 8 were small. As a result, PTT fibers showing a low fluff ratio and excellent in quality could be obtained. Moreover, in each of the examples, the amounts of acrolein and allyl alcohol generated were small. Furthermore, the yarn frictional breakage numbers in Examples 1, 5 were 431 times and 453 times, respectively. In addition, the average particle size of titanium oxide particles in the fibers thus obtained was 0.5 μm.

COMPARATIVE EXAMPLE 1

The procedure of Example 1 was repeated except that a phosphorus compound and a hindered phenol antioxidant were not added and that a dispersion of titanium oxide prepared by the procedure (1) in Reference Example 1 was added.

The resin composition thus obtained contained many aggregates. As a result, the spinning nozzle pack pressure was as large as 52 kg/cm$^2$, and the fluff ratio also became large. An increase in the frictional coefficient is estimated to have caused the increase in the fluff ratio. Moreover, when the chips were rubbed, they produced a larger amount of powder than those obtained in Example 1.

Furthermore, the yarn frictional breakage number was as small as 76 times.

COMPARATIVE EXAMPLE 2

The procedure of Example 1 was repeated except that trimethyl phosphate was added in an amount of 0.05% by weight and titanium oxide was not added, and that a dispersion of titanium oxide prepared by the procedure (1) in Reference Example 1 was added.

Since the resin composition thus obtained contained no titanium oxide, the spinning nozzle pack pressure was as low as 9 kg/cm$^2$. However, the frictional coefficient was high, and the yarn was caught by a hot roll during drawing to increase the fluff ratio. Moreover, the fiber thus obtained had an excessively high luster to give a cheap feeling.

COMPARATIVE EXAMPLE 3

A yarn of 50 d/36 f was prepared from a PET containing no titanium oxide and having an intrinsic viscosity of 0.72. Another yarn of 50 d/36 f was prepared from a PET prepared by conducting polymerization while a dispersion of titanium oxide having been prepared by dispersing, by the procedure (2), the titanium oxide used in Example 1 in ethylene glycol was used, containing 0.5% by weight of titanium oxide, and having an intrinsic viscosity of 0.72. The frictional coefficient of both yarns was measured. The former and the latter yarns showed frictional coefficients of 1.967 and 1.934, respectively. In the preparation of the yarns, 0.7% by weight of a finish oil composed of 30% by weight of oleyl oleate, 35% by weight of hexyl stearate, 30% by weight of an emulsifying agent and 5% by weight of an antistatic agent was allowed to stick to each of the yarns. Moreover, both yarns showed a yarn frictional breakage number of 2,000 times or more.

Furthermore, a yarn of 50 d/36 f was prepared from a PET prepared by conducting polymerization while a dispersion of titanium oxide having been prepared by dispersing, by the procedure (1), the titanium oxide used in Example 1 in ethylene glycol was used, containing 0.5% by weight of titanium oxide, and having an intrinsic viscosity of 0.72. The above finish oil was used. The resultant yarn contained 16/mg of the yarn of aggregates, and showed a frictional coefficient of 1.936 and a yarn frictional breakage number of 2,000 times or more.

Although a PET fiber has a chemical structure similar to that of a PTT fiber, the PET fiber greatly differs from the PTT fiber in that the aggregates in the PET fiber only very slightly influence the frictional coefficient and wear resistance.

EXAMPLE 9

Dimethyl terephthalate (hereinafter abbreviated to DMT) in an amount of 25,000 parts by weight, 21,553 parts by weight of 1,3-propanediol and a 7:1 mixture of calcium acetate and cobalt acetate tetrahydrate as an ester interchange catalyst in an amount of 0.1% by weight/DMT (the unit expressing a weight ratio to DMT) of a theoretical polymer amount were mixed, and an ester interchange reaction was effected at 50° C. for 3 hours. Trimethyl phosphate was then added in an amount of 0.1% by weight/DMT, and the dispersion of titanium oxide prepared by the procedure (4) was further added so that the titanium oxide content became 0.4% by weight. Thereafter, polymerization was conducted at a vacuum degree of 0.1 torr at 275° C. for 3 hours to give an ester resin composition having an intrinsic viscosity of 0.75 and excellent in whiteness. The resin composition had a phosphorus content of 180 ppm and a cobalt content of 20 ppm.

The number of aggregates of titanium oxide in the yarn obtained by spinning by a procedure described in [7] Method of Evaluating Spinnability of Resin Composition was 1/mg of the yarn. The rise in the spinning nozzle pack pressure was 12 kg/cm$^2$, and the yarn showed a low frictional coefficient. As a result, the yarn gave a PTT fiber showing a low fluff ratio and having good quality. The fiber had a phosphorus content of 175 ppm and a cobalt content of 15 ppm. The amounts of generated acrolein and allyl alcohol were at a low level. Moreover, the average particle size of titanium oxide in the fiber was 0.5 μm, and the PTT content thereof was 99% by weight.

TABLE 1

Composition and Physical Properties of Starting Materials (Polyester Resin Compositions)

| | Additives | Amt. of P ppm | Content of Ti oxide % | Amt. of PPT wt. % | Intrinsic viscosity dl/g | Number of TiO$_2$ aggregates number/mg resin | Rise in pressure kg/cm$^2$ | Amts. of acrolein and allyl alc.* ppm |
|---|---|---|---|---|---|---|---|---|
| Ex. | | | | | | | | |
| 1 | OP(OCH$_3$)$_3$ 0.05 wt. % | 88 | Procedure (2) 0.5 wt. % | 98.7 | 0.92 | 2 | 25 | 3.9 7.2 |
| 2 | OP(OCH$_3$)$_3$ 0.05 wt. % | 80 | Procedure (3) 0.5 wt. % | 98.9 | 0.92 | 4 | 35 | 3.5 8.3 |
| 3 | OP(OCH$_3$)$_3$ 0.05 wt. % | 83 | Procedure (4) 0.5 wt. % | 98.8 | 0.92 | 1 | 15 | 3.7 8.4 |
| 4 | — | 0 | Procedure (4) 0.5 wt. % | 98.7 | 0.92 | 2 | 17 | 4.2 10.1 |
| 5 | Irg1010 0.05 wt. % | 0 | Procedure (4) 0.5 wt. % | 98.7 | 0.92 | 1 | 15 | 4.0 7.8 |
| 6 | OP(OCH$_3$)$_3$ 0.02 wt. % Irg1010 0.03 wt. % | 40 | Procedure (4) 0.5 wt. % | 98.7 | 0.92 | 1 | 16 | 3.4 5.6 |
| 7 | OP(OCH$_3$)$_3$ 0.1 wt. % | 161 | Procedure (4) 0.05 wt. % | 98.6 | 0.92 | 1 | 11 | 3.2 5.1 |
| 8 | OP(OCH$_3$)$_3$ 0.1 wt. % | 156 | Procedure (4) 2.0 wt. % | 98.6 | 0.92 | 7 | 25 | 3.4 5.7 |
| 9 | OP(OCH$_3$)$_3$ 0.1 wt. % | 157 | Procedure (4) 0.4 wt. % | 99.2 | 0.75 | 2 | 12 | 3.5 5.8 |
| Comp. Ex. | | | | | | | | |
| 1 | — | 0 | Procedure (1) 0.5 wt. % | 98.7 | 0.92 | 32 | 52 | 4.3 12.6 |
| 2 | OP(OCH$_3$)$_3$ 0.05 wt. % | 85 | No addition | 99.1 | 0.92 | 0 | 9 | 3.0 5.1 |

Note:
*The upper and lower rows indicate an amount of acrolein and an amount of allyl alcohol, respectively.
PTT: polytrimethylene terephthalate
Irg1010: pentaerythritol tetrakis[3-(3,5-di-tert-butyl-4-hydroxyphenyl)propionate] (hindered phenol antioxidant, manufactured by Ciba Speciality Chemical)

TABLE 2

Polyester Fibers and Physical Properties

| | Additives | Amt. of P ppm | Content of Ti oxide % | Amt. of PPT wt. % | Intrinsic viscosity dl/g | Number of TiO$_2$ aggregates number/mg resin | Amts. of acrolein and allyl alc.* ppm |
|---|---|---|---|---|---|---|---|
| Ex. | | | | | | | |
| 1 | OP(OCH$_3$)$_3$ 0.05 wt. % | 87 | Procedure (2) 0.5 wt. % | 98.6 | 0.90 | 2 | 3.8 7.1 |
| 2 | OP(OCH$_3$)$_3$ 0.05 wt. % | 78 | Procedure (3) 0.5 wt. % | 98.8 | 0.90 | 2 | 3.4 8.2 |
| 3 | OP(OCH$_3$)$_3$ 0.05 wt. % | 80 | Procedure (4) 0.5 wt. % | 98.8 | 0.90 | 1 | 3.7 8.3 |
| 4 | — | 0 | Procedure (4) 0.5 wt. % | 98.4 | 0.87 | 1 | 4.7 13.4 |
| 5 | Irg1010 0.05 wt. % | 0 | Procedure (4) 0.5 wt. % | 98.4 | 0.88 | 1 | 4.0 7.7 |
| 6 | OP(OCH$_3$)$_3$ 0.02 wt. % Irg1010 0.03 wt. % | 41 | Procedure (4) 0.5 wt. % | 98.4 | 0.90 | 1 | 3.2 5.3 |
| 7 | OP(OCH$_3$)$_3$ 0.1 wt. % | 156 | Procedure (4) 0.05 wt. % | 98.9 | 0.91 | 1 | 3.1 5.0 |
| 8 | OP(OCH$_3$)$_3$ 0.1 wt. % | 156 | Procedure (4) 2.0 wt. % | 98.2 | 0.91 | 2 | 3.7 5.7 |
| 9 | OP(OCH$_3$)$_3$ 0.1 wt. % | 153 | Procedure (4) 0.4 wt. % | 99.1 | 0.73 | 1 | 3.3 5.7 |
| Comp. Ex. | | | | | | | |
| 1 | — | 0 | Procedure (1) 0.5 wt. % | 98.4 | 0.86 | 21 | 4.8 13.1 |
| 2 | OP(OCH$_3$)$_3$ 0.05 wt. % | 85 | No addition | 99.2 | 0.90 | 0 | 3.1 5.2 |

| | Strength g/d | Elongation % | Elastic modulus g/d | Elastic recovery % | Birefringent index | Frictional coefficient | Fluff ratio % |
|---|---|---|---|---|---|---|---|
| Ex. | | | | | | | |
| 1 | 4.2 | 37 | 23 | 89 | 0.072 | 1.500 | 0.2 |
| 2 | 4.2 | 37 | 23 | 85 | 0.073 | 1.501 | 0.2 |
| 3 | 4.3 | 37 | 23 | 87 | 0.071 | 1.502 | 0.2 |
| 4 | 4.3 | 36 | 25 | 90 | 0.065 | 1.503 | 0.4 |
| 5 | 4.4 | 36 | 23 | 88 | 0.072 | 1.502 | 0.2 |
| 6 | 4.3 | 38 | 25 | 84 | 0.072 | 1.510 | 0.3 |
| 7 | 4.3 | 37 | 26 | 85 | 0.078 | 1.904 | 0.3 |
| 8 | 4.2 | 37 | 28 | 87 | 0.076 | 1.476 | 0.2 |
| 9 | 4.3 | 38 | 28 | 90 | 0.078 | 1.532 | 0.2 |
| Comp. Ex. | | | | | | | |
| 1 | 3.7 | 38 | 25 | 85 | 0.075 | 1.515 | 1.3 |
| 2 | 4.0 | 37 | 24 | 87 | 0.073 | 2.014 | 1.4 |

Note:
*The upper and lower rows indicate an amount of acrolein and an amount of allyl alcohol, respectively.
PTT: polytrimethylene terephthalate
Irg1010: pentaerythritol tetrakis[3-(3,5-di-tert-butyl-4-hydroxyphenyl)propionate] (hindered phenol antioxidant, manufactured by Ciba Specialty Chemical)

EXAMPLE 10

Dimethyl terephthalate (hereinafter abbreviated to DMT) in an amount of 25,000 parts by weight, 500 parts by weight of dimethyl 5-sodiumsulfoisophthalate, 21,553 parts by weight of 1,3-propanediol and a 7:1 mixture of calcium acetate and cobalt acetate tetrahydrate as an ester interchange catalyst in an amount of 0.1% by weight/DMT (the unit expressing a weight ratio to DMT) of a theoretical polymer amount were mixed, and an ester interchange reaction was effected at 50° C. for 3 hours. Trimethyl phosphate was then added in an amount of 0.1% by weight/ DMT, and the dispersion of titanium oxide prepared by the procedure (4) was further added so that the titanium oxide content became 0.04% by weight. Thereafter, polymerization was conducted at a vacuum degree of 0.1 torr at 275° C. for 3 hours to give an ester resin composition having an intrinsic viscosity of 0.68, excellent in whiteness, containing 96.5% by weight of a PTT and showing a number of aggregates of titanium oxide of 2/mg of the resin. The resin composition had a phosphorus content of 171 ppm and a cobalt content of 18 ppm. The resin composition contained titanium oxide having an average particle size of 0.5 µm, and had a PTT content of 97.5% by weight.

The number of aggregates of titanium oxide in the yarn obtained by spinning by a procedure described in [7] Method of Evaluating Spinnability of Resin Composition was 1/mg of the yarn. The rise in the spinning nozzle pack pressure was 15 kg/cm², and the yarn showed a frictional coefficient as low as 1.563. As a result, the yarn gave a PTT fiber showing a fluff ratio as low as 0.2, having good quality, and showing a birefringent index of 0.075. Moreover, the generated amounts of acrolein and allyl alcohol were as low as 3.3 ppm and 5.8 ppm, respectively. The fiber had a phosphorus content of 164 ppm and a cobalt content of 15 ppm. The average particle size of titanium oxide in the fiber was 0.5 μm, and the PTT content thereof was 97.4% by weight.

EXAMPLE 11

An experiment was repeated under the condition Example 4, while cobalt acetate was added at the initial stage of polymerization in an amount of 0.05% by weight/TPA. The content of cobalt was 8 ppm: The number of aggregates of titanium oxide was 0.5/mg of the resin. The pressure rise was 10 kg/cm², and the fluff ratio was 0. The resin composition contained titanium oxide having an average particle size of 0.5 μm and had a PTT content of 99% by weight.

A PTT fiber showing a birefringent index of 0.075, having a cobalt content of 5 ppm, and containing aggregates of titanium oxide in a number of 0.1/mg of the fiber could be obtained by spinning by a procedure described in [7] Method of Evaluating Spinnability of Resin Composition. Moreover, the generated amounts of acrolein and allyl alcohol were as low as 3.1 ppm and 5.7 ppm, respectively. The average particle size of titanium oxide in the fiber was 0.5 μm, and the PTT content thereof was 99% by weight.

EXAMPLE 12

A warp-knitted fabric was prepared from the polyester fiber obtained in Example 9 and a polyurethane-based stretch fiber (trade name of Roica, manufactured by Asahi Chemical Industry Co., Ltd.) of 210 denier. The gauge was 28 G, and the loop length of the polyester fiber and that of the stretch fiber were 1,080 mm/480 courses and 112 mm/480 courses, respectively. The thread count was 90 courses/inch. Moreover, the blending ratio of the polyester fiber was set at 75.5%.

The gray fabric thus obtained was relax scoured at 90° C. for 2 minutes, and dry heat set at 160° C. for 1 minute. The fabric was then dyed in a dyeing bath (pH adjusted to 6, a bath ratio of 1:30) containing 8% owf of a disperse dye (trade name of Dianix Black BG-FS, manufactured by Dyestar Japan) and 0.5 g/liter of a dye-assist agent (trade name of Nicca Sunsolt 1200) at 110° C. for 60 minutes.

The fabric thus obtained was soft and rich in stretchability, showed a suitable luster, and had a unique feeling that cannot be obtained from conventional PET fibers and nylon fibers.

EXAMPLE 13

A warp-knitted fabric was prepared from the polyester fiber obtained in Example 10 and a polyurethane-based stretch fiber (trade name of Roica, manufactured by Asahi Chemical Industry Co., Ltd.) of 210 denier. The gauge was 28 G, and the loop length of the polyester fiber and that of the stretch fiber were 1,080 mm/480 courses and 112 mm/480 courses, respectively. The thread count was 90 courses/inch. Moreover, the blending ratio of the polyester fiber was set at 75.5%.

The gray fabric thus obtained was relax scoured at 90° C. for 2 minutes, and dry heat set at 160° C. for 1 minute. An aqueous solution was prepared by adding 1 g/liter of a dispersing agent (trade name of Disper TL, manufactured by Meisei Kagaku K.K.), 50 g/liter of sodium sulfate and 15 g/liter of sodium carbonate, and adjusting the pH to 11. A cationic dye (Kayacryl Black BS-ED, manufactured by Nippon Kayaku Co, Ltd.) in an amount of 2% owf was added to the aqueous solution to give a dyeing bath. The fabric was dyed in the bath in a bath ratio of 1:50 at 110° C. for 1 hour. The dyed fabric was then soaped in a bath (a bath ratio of 1:50) containing 1 g/liter of Granup P (trade name, manufactured by Sanyo Chemical Industries) at 80° C. for 10 minutes. The fabric was subsequently finished by a conventional procedure.

The fabric thus obtained was soft and rich in stretchability, showed a suitable luster and excellent sharpness, and had a unique feeling that cannot be obtained from conventional PET fibers and nylon fibers.

INDUSTRIAL APPLICABILITY

Since the polyester resin composition of the present invention having a PTT as its major component contains a highly fine dispersion of titanium oxide, a suitably delustered PTT fiber having a suitable luster is provided by stabilized melt spinning with a decreased rise in the pack pressure. Moreover, the fiber strength and wear resistance of the fiber are less lowered by the aggregates of titanium oxide, and the frictional coefficient of the fiber is decreased. As a result, friction of the fiber on rolls and guides with which the fiber is contacted in spinning and treating stages is decreased, and a fiber that can be smoothly spun or treated can be provided.

Although the PTT resin composition of the present invention contains titanium oxide, the generation amounts of acrolein and allyl alcohol are suppressed during drying the chips, etc. prior to spinning. Therefore, a resin composition and a fiber excellent in whiteness can be obtained.

The polyester fiber of the present invention is useful for clothing such as underwear, sportswear, pantyhose, lining cloth and swimwear, and is further useful as a fiber material for articles such as carpets, padding cloth, flocking, strings, artificial lawns, ropes, bags, umbrella cloth and tents. The resin composition of the present invention can also be used for films and molded articles.

What is claimed is:

1. A polyester resin composition having an intrinsic viscosity of 0.4 to 2, which satisfies the following conditions (1) to (3):
   (1) the polyester resin composition is composed of a polyester resin component comprising 90% by weight or more of a polytrimethylene terephthalate;
   (2) the polyester resin composition contains 0.01 to 3% by weight of titanium oxide particles having an average particle size from 0.01 to 2 μm; and
   (3) the polyester resin composition contains 25 or less/mg of the resin of agglomerates of titanium oxide particles which agglomerates have a lengthwise size exceeding 5 μm.

2. The polyester resin composition according to claim 1, wherein the polyester resin composition further contains a phosphorus compound in an amount of 5 to 250 ppm as phosphorus and/or 0.002 to 2% by weight of a hindered phenol antioxidant.

3. The polyester resin composition according to claim 2, wherein the phosphorus compound is a phosphate of the formula O=P(OR$^1$) (OR$^2$) (OR$^3$) or a phosphite of the formula P(OR$^4$) (OR$^5$) (OR$^6$) wherein R$^1$, R$^2$, R$^3$, R$^4$, R$^5$ and R$^6$ are independent of each other, and are selected from a hydrogen atom, an organic group of 1 to 30 carbon atoms, an alkali metal and an alkaline earth metal.

4. The polyester resin composition according to any one of claims 1 to 3, wherein the polyester resin composition further contains a cobalt compound in an amount of 1 to 25 ppm as cobalt.

5. A process for producing a polyester resin composition, wherein dicarboxylic acid mainly containing terephthalic acid or a lower alcohol ester derivative of terephthalic acid is reacted with diol mainly containing 1,3-propanediol to form a 1,3-propanediol ester of terephthalic acid and/or an oligomer thereof, and the ester and/or oligomer is subjected to a polycondensation reaction to give a polyester, the process comprising adding a dispersion of titanium oxide particles obtained by adding once titanium oxide particles in 1,3-propanediol, stirring the mixture, and removing agglomerates having a lengthwise size exceeding 5 micrometer of titanium oxide particles, at an optional stage selected from the start of the reaction to the finish of the polycondensation reaction, and then completing the polycondensation reaction.

6. A process for producing a polyester resin composition, wherein dicarboxylic acid mainly containing terephthalic acid or a lower alcohol ester derivative of terephthalic acid is reacted with diol mainly containing 1,3-propanediol to form a 1,3-propanediol ester of terephthalic acid and/or an oligomer thereof, and the ester and/or oligomer is subjected to a polycondensation reaction to give a polyester, the process comprising adding a dispersion of titanium oxide particles obtained by adding titanium oxide particles to 1,3-propanediol, stirring the mixture, and removing agglomerates having a lengthwise size exceeding 5 micrometer of titanium oxide particles, at an optional stage selected from the start of the reaction to the finish of the polycondensation reaction, completing the polycondensation reaction, solidifying the polyester resin composition thus obtained, heating the polyester resin composition in a solid state, whereby the intrinsic viscosity thereof is increased by 0.1 or more in comparison with the intrinsic viscosity at the finish of the polycondensation reaction.

7. The process for producing a polyester resin composition according to claims 5 or 6, wherein the agglomerates having a lengthwise size exceeding 5 micrometer of titanium oxide are removed by centrifugal separation at a rotation speed of 500 rpm or more.

8. A polyester fiber having an intrinsic viscosity of 0.4 to 2, which satisfies the following conditions (1) to (4):

(1) the polyester fiber is composed of a polyester resin comprising 90% by weight or more of polytrimethylene terephthalate;

(2) the polyester fiber contains from 0.01 to 3% by weight of titanium oxide having an average particle size of 0.01 to 2 $\mu$m;

(3) the polyester fiber contains 12 or less/mg of the fiber of agglomerates of titanium oxide particles which agglomerates have a lengthwise size exceeding 5 $\mu$m; and (4) the polyester fiber has a birefringent index of 0.03 or more.

9. The polyester fiber according to claim 8, wherein the polyester fiber further contains a phosphorus compound in an amount of 5 to 250 ppm as phosphorus and/or 0.002 to 2% by weight of a hindered phenol antioxidant.

10. The polyester fiber according to claim 8 or 9, wherein the phosphorus compound is a phosphate of the formula $O=P(OR^1)(OR^2)(OR^3)$ or a phosphite of the formula $P(OR^4)(OR^5)(OR^6)$ wherein $R^1, R^2, R^3, R^4, R^5$ and $R^6$ are independent of each other, and are selected from a hydrogen atom, an organic group of 1 to 30 carbon atoms, an alkali metal and an alkaline earth metal.

11. The polyester fiber according to claims 8 or 9, wherein the polyester fiber further contains a cobalt compound in an amount of 1 to 25 ppm as cobalt.

12. A fabric partly or entirely formed from the polyester fiber according to claims 8 or 9.

13. The fabric according to claim 12, wherein the fabric is dyed with a disperse or cationic dye.

* * * * *